(12) United States Patent
Schmidt

(10) Patent No.: US 8,448,149 B2
(45) Date of Patent: May 21, 2013

(54) METHOD FOR THE CONVERSION OF LADDER DIAGRAMS

(75) Inventor: Andreas Schmidt, Offenbach (DE)

(73) Assignee: Schneider Electric Automation GmbH, Seligenstadt (DE)

( * ) Notice: Subject to any disclaimer, the term of this patent is extended or adjusted under 35 U.S.C. 154(b) by 959 days.

(21) Appl. No.: 12/525,870

(22) PCT Filed: Feb. 19, 2008

(86) PCT No.: PCT/EP2008/051976
§ 371 (c)(1),
(2), (4) Date: Aug. 5, 2009

(87) PCT Pub. No.: WO2008/101916
PCT Pub. Date: Aug. 28, 2008

(65) Prior Publication Data
US 2010/0094437 A1    Apr. 15, 2010

(30) Foreign Application Priority Data
Feb. 19, 2007   (DE) ........................ 10 2007 008 451

(51) Int. Cl.
| G06F 9/44 | (2006.01) |
| G06F 9/45 | (2006.01) |
| G06F 7/60 | (2006.01) |
| G06F 17/10 | (2006.01) |
| G06G 7/48 | (2006.01) |
| G05B 11/01 | (2006.01) |

(52) U.S. Cl.
USPC .............. 717/136; 717/105; 717/109; 703/2; 703/3; 700/18

(58) Field of Classification Search
None
See application file for complete search history.

(56) References Cited

U.S. PATENT DOCUMENTS

| 5,504,902 A * | 4/1996 | McGrath et al. ............... 717/146 |
| 5,586,335 A * | 12/1996 | Utan ............................... 700/18 |
| 5,623,401 A * | 4/1997 | Baxter .......................... 700/18 |
| 2006/0155393 A1* | 7/2006 | Klein ............................. 700/18 |

* cited by examiner

Primary Examiner — Kris Rhu
(74) Attorney, Agent, or Firm — Ladas & Parry LLP

(57) ABSTRACT

A method for converting traditional ladder diagrams for programmable controllers according to model 984, for example, the traditional ladder diagrams being read and executed column by column, into ladder diagrams for IEC 61131-oriented controllers, for example, with the ladder diagrams being read and executed in a data flow-oriented manner. In order to carry out the method, it is determined, in the ladder diagrams that are traditionally read and executed column by column, whether variables are provided on coils as well as on contacts within the network, and it is determined whether the contact is processed according to model 984 in front of the associated coil and according to the IEC model behind the associated coil. If so, an additional variable is generated for each such variable, and the additional variable is fed to the respective contact instead of the original variable. Furthermore, a contact including the original variable is connected to a power supply simulation at the end of the network, followed by a coil encompassing the generated variable.

2 Claims, 5 Drawing Sheets

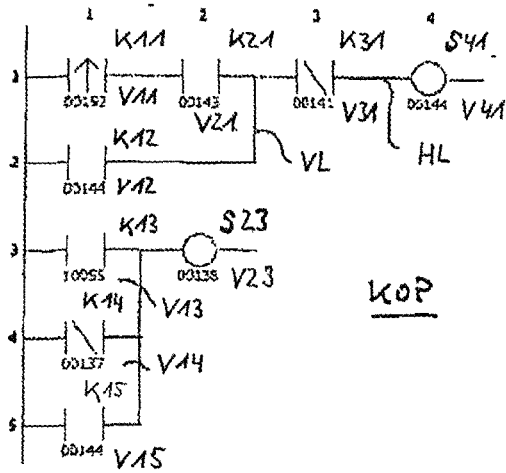

Fig. 1

| | |
|---|---|
| —\| \|— | Contacts are symbolized as line disconnections with two opposing short vertical lines. |
| —\|\\\|— | The diagonal line between the vertical lines indicates a normally closed contact. |
| —\|↑\|— | An arrow pointing upward between vertical lines indicates a contact that determines the positive edge of the variable associated with the contact. |
| —O— | Coils are symbolized by a circle inserted into the line. |
| 00144 | The designations of the variables associated with objects are written under the symbols. |
| | The vertical line on the left side of the graphic chart, to which the contact symbols are connected, is the power supply simulation. |
| | Vertical connections pass on voltage, if a contact on their left applies a voltage to them. |

Fig. 2

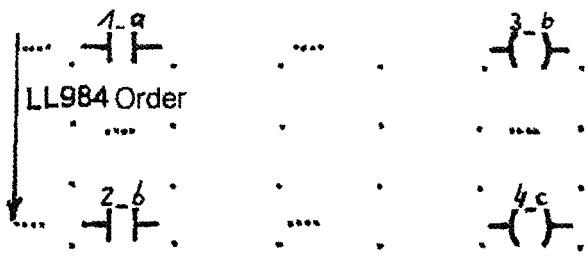
Fig. 3
| 1 | 2 | 3 | 4 | 5 | 6 | 7 | 8 | 9 |
|---|---|---|---|---|---|---|---|---|
| Column 1 Row 1 | Column 1 Row 2 | Column 1 Row 3 | Column 1 Row 4 | Column 1 Row 5 | Column 2 Row 1 | Column 2 Row 3 | Column 3 Row 1 | Column 4 Row 1 |
| —|↑|— | —| |— | —| |— | —|\|— | —| |— | —| |— | —O— | —|\|— | —O— |
| 00192 | 00144 | 10055 | 00137 | 00144 | 00143 | 00138 | 00141 | 00144 |
Fig. 4
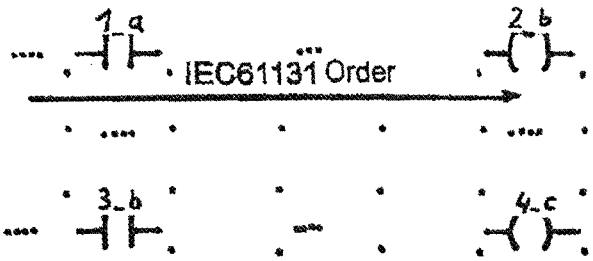
Fig. 5
| 1 | 2 | 3 | 4 | 5 | 6 | 7 | 8 | 9 |
|---|---|---|---|---|---|---|---|---|
| Column 1 Row 1 | Column 2 Row 1 | Column 1 Row 2 | Column 3 Row 1 | Column 4 Row 1 | Column 1 Row 3 | Column 1 Row 4 | Column 1 Row 5 | Column 2 Row 3 |
| —|↑|— | —| |— | —| |— | —|\|— | —O— | —| |— | —|\|— | —| |— | —O— |
| 00192 | 00143 | 00144 | 00141 | 00144 | 10055 | 00137 | 00144 | 00138 |
Fig. 6

As programming guide:
Declare coil table
For all objects of the ladder diagram
    Sequentially number objects in one of the two orders
        If the object is a coil
            Enter coil in coil table using its variable name as key
    Sweep through objects of the ladder diagram in the other order
        Determine order number of the object
        If the object is a contact
            Query coil table for associated coil using the variable name of the contact
            If the coil is present
                If the 984 sequence number of the contact is less than the IEC order
                    number of the coil
                    If the IEC order number of the contact is greater than the IEC
                        order number of the coil
                    Create delay element
Create delay element
    Generate additional variable
    Associate additional variable with contact instead of original variable
    At the end of the ladder diagram, connect a contact with the original variable to the power
        supply simulation,
followed by a coil with the generated variable.

Fig. 7

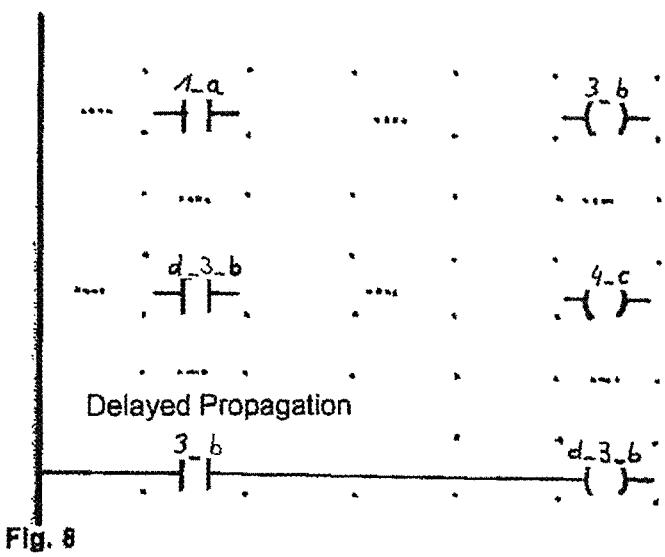

Fig. 8

| 1 | 2 | 3 | 4 | 5 |
|---|---|---|---|---|
| Column 1 Row 1 | Column 2 Row 1 | Column 1 Row 2 | Column 3 Row 1 | Column 4 Row 1 |
| —↑— | —| |— | —| |— | —|\|— | —O— |
| 00192 | 00143 | 00144 | 00141 | 00144 |

| 6 | 7 | 8 | 9 | 10 | 11 |
|---|---|---|---|---|---|
| Column 1 Row 3 | Column 1 Row 4 | Column 1 Row 5 | Column 2 Row 3 | Column 1 Row 6 | Column 2 Row 6? |
| —| |— | —|\|— | —| |— | —O— | —| |— | —O— |
| 10055 | 00137 | d144 | 00138 | 00144 | d144 |

METHOD FOR THE CONVERSION OF LADDER DIAGRAMS

The invention relates to a method for the conversion of traditional ladder diagrams—read and executed column by column—for programmable logic controllers according to model 984, into ladder diagrams for IEC 61131 controllers.

Ladder diagrams model conventional contactor controls for programmable logic controllers. They are structured in lines and are made up of various contacts, coils, horizontal and vertical connections, function blocks, and a power supply simulation.

In contrast to contactor controllers, in which the values of all elements are determined in parallel (simultaneously), programmable logic controllers process the values of all elements one after the other (sequentially).

Thus the processing order has to be seen as a new additional criterion that affects function. It is common for ladder diagrams to additionally be subdivided into networks, which in the following shall be considered as independent ladder diagrams of their own.

FIG. 1 shows an example of a ladder diagram KOP. The ladder diagram KOP is a method for programming programmable logic controllers. This is a standardized graphical language that uses a representation that follows that of circuit diagrams. Starting from a simulated power supply SV, objects are labelled as contacts Kcr or coils Scr. To each object is assigned a variable Vcr, with $1 \leq c^*$, $r \leq n$. If the objects are connected in series via connecting lines, then this signifies an AND operation. The objects of a series connection are arranged in individual columns. The arrangement of objects in several rows, rows 1 to 5 in the illustrated ladder diagram, serves to represent an OR operation. Horizontal lines serve to link the objects, while vertical lines VL serve to connect horizontal lines HL, so that branches can be formed. Any value applied to the left side is passed to the objects connected on the right side.

In FIG. 1, for example, the coil S41 is driven via the contact K21 and assumes its seal-in state via contact K21. Also, the contact K15 is used to energize the coil S23.

Explanations of the individual objects can be found in the table of FIG. 2.

Ladder diagrams can also contain elements that, similar to vertical connections, extend over several rows and consequently can have several inputs and outputs. With respect to the method described here, these elements can be treated as vertical connections and for this reason will not be described in any further detail.

Ladder diagrams for programmable logic controllers in accordance with the 984 model, an example of which is shown in FIG. 3, are read and executed line by line from top to bottom for each column and then column by column from left to right.

FIG. 4 illustrates the order of object execution in programmable logic controllers that are built according to the 984 standard. It is apparent that the new value of the seal-in coil only becomes effective after the sequential processing.

Ladder diagrams pursuant to FIG. 5 for IEC 61131-oriented controllers are read and executed in a data-flow oriented manner, i.e. prior to execution of a ladder diagram element all input values of this element must have been determined. Once all input values for an element have been determined, processing immediately advances along the horizontal direction.

This has an especially significant effect in the seemingly simple vertical connections, since the new value of all elements on the left side must be determined before determining the total value of the vertical connection.

The immediate advance in the horizontal direction represents the fundamental difference between the two systems.

FIG. 6 shows the execution order for the above example in an IEC 61131 system.

The new value of the seal-in coil S1 (column 4, row 1) becomes effective before any further processing (column 1, row 3 to column 2, row 3).

This behaviour is considerably different from that of LL984 processing, which can lead to substantial, even safety-relevant problems in the system operation.

In general: if several functional blocks or coils with variables returned to contacts are contained in the same ladder diagram, then this can result in a markedly different behaviour of the executing controller.

Based on this background, the objective of the present invention is to further develop a method of the above-mentioned type in a way so that ladder diagrams for 984 model controllers can be processed on IEC 61131 type controllers.

This objective is met by the invention by determining in a traditional ladder diagram that is read and executed column by column, whether within the network variables occur both on coils and on contacts, by determining whether the contact is processed in accordance with the 984 model before the associated coil or in accordance with the IEC model after the associated coil, by in the affirmative case generating for each such variable one additional variable and by recording said additional variable in the respective contact instead of the original variable, and by further at the end of the network connecting to the simulated power supply a contact carrying the original variable, followed by a coil with the generated variable.

To start with, the objects of a ladder diagram are numbered consecutively in one of the two orders and the coils of the ladder diagram are recorded in a table with their respective variable name as the key.

Subsequently, the objects are read in the other order and the order number for each object is determined. If a contact is found, its variable name is used in querying the coil table, to determine whether the coil triggering it is also present in the ladder diagram.

A comparison of the order numbers of the contact and of the coil is used to determine whether a delay element has to be introduced for the contact.

To create a delay element, one additional variable has to be generated and this additional variable is attached to the contact instead of the original variable. In addition a contact with the original variable is connected to the power supply simulation at the end of the ladder diagram, followed by a coil with the generated variable.

A preferred processing approach is characterized by connecting the functional blocks of a ladder diagram using EN inputs and ENO outputs appropriate for IEC 61131-oriented controllers in the order of processing of the 984 model.

Further details, advantages, and features of the invention are not only found in the claims and the characteristic features described therein—on their own and/or in combination—but also in the following description of a preferred embodiment example illustrated in the figures.

FIG. 1 shows a ladder diagram in accordance with LL 984.

FIG. 2 shows a table with explanations of symbols used in the ladder diagram of FIG. 1.

FIG. 3 shows a schematic representation of the processing order of a LL 984 ladder diagram.

FIG. 4 shows a table with the sequence of processed objects of the LL 984 ladder diagram of FIG. 1.

FIG. 5 shows a schematic representation of the processing order of a ladder diagram in accordance with IEC 61131.

FIG. 6 shows a table with the processing sequence of objects of the ladder diagram of FIG. 1 in the IEC 61131 order.

FIG. 7 shows a representation of the method by way of program steps.

FIG. 8 shows a schematic representation of a ladder diagram with delayed propagation.

FIG. 7 is a schematic representation of a flow chart of the method. The first step consists of the declaration of a coil table. For all objects of the ladder diagram, the objects are numbered consecutively in one of the two orders. If the object is a coil, the coil is entered into the coil table using its variable as key.

Subsequently, the objects of the ladder diagram are swept through in the other order, whereby the order number of the object is determined. If the object is a contact, the coil table is queried using the variable name of the contact to find the associated coil. If the coil is present, i.e. the 984 order number of the contact is less than the IEC order number of the coil or the IEC order number of the contact is greater than the IEC order number of the coil, then a delay element VZE is created.

Figures 9, 10:
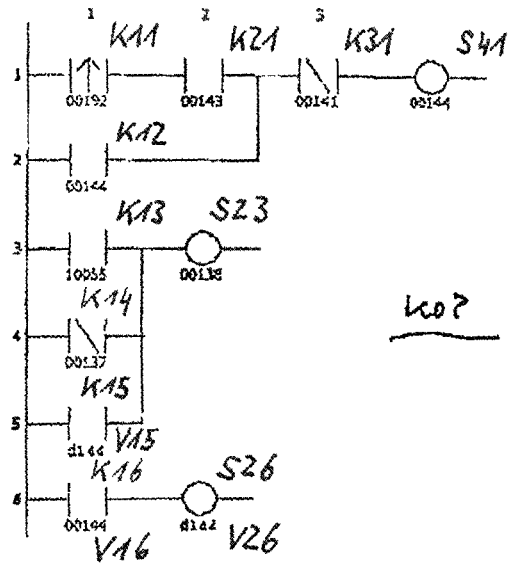
FIG. 9 shows a representation of the IEC 61131 ladder diagram derived from the LL984 ladder diagram of FIG. 1.
FIG. 10 shows a table with the processing sequence of objects of the IEC 61131 ladder diagram of FIG. 9.

As illustrated in FIGS. 8 and 9, creation of the delay element VZE encompasses generation of an additional variable V15, V26, whereby the additional variable V26 is associated with the respective contact K4 instead of the original variable V14. As illustrated as an example in FIG. 9, a contact with the original variable is connected to the simulated power supply at the end of the ladder diagram, followed by a coil with the generated variable.

FIG. 9 illustrates the ladder diagram that is obtained for the example describe here, whereby the additionally generated variable V15, V26 is labelled "d144".

The processing order is illustrated in FIG. 10. Accordingly, the new value "d144" of the seal-in coil S1 in column 4, row 1 in the sequential processing will only become known after its execution, which will create an overall behaviour identical to that of the original 984 ladder diagram.

Figure 11:
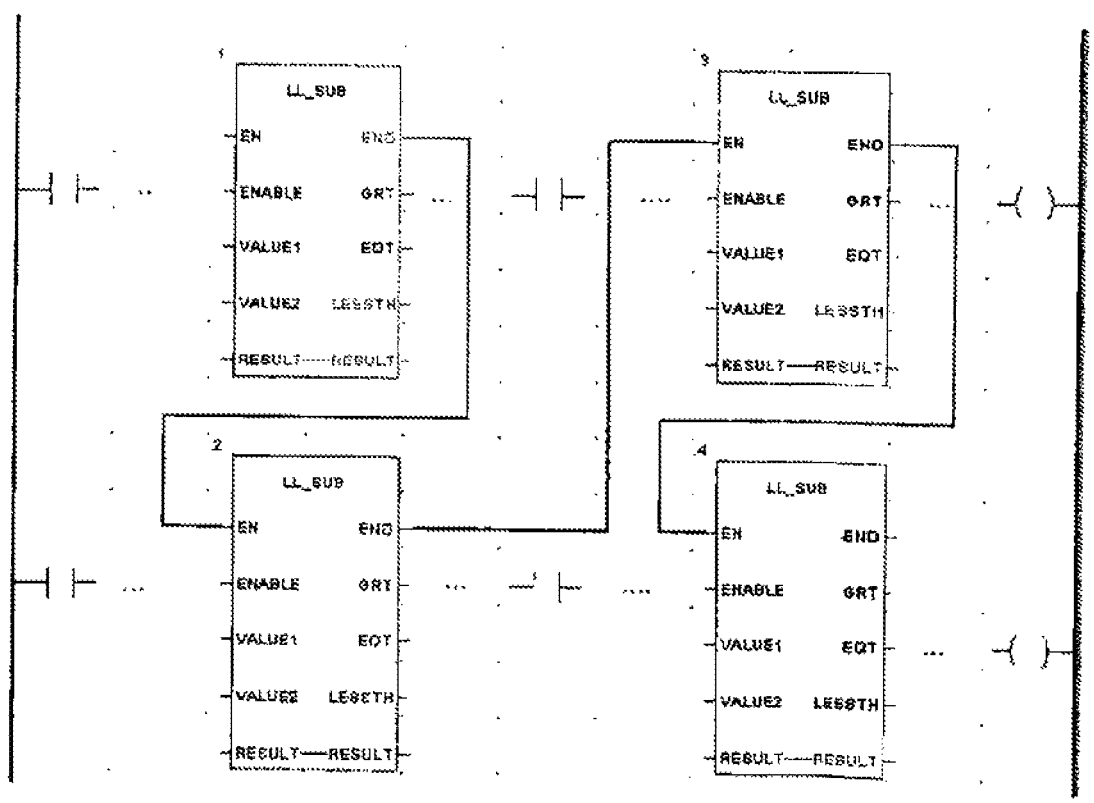
FIG. 11 shows a IEC 61131 ladder diagram with functional blocks.

FIG. 11 shows a ladder diagram KP with functional block FB. With the help of the EN inputs and ENO outputs, which in accordance with IEC 61131 must additionally be added to modular units, the functional blocks of a ladder diagram are connected in the order of the 984 processing, since modular units can be connected to each other along the vertical direction and do not have to be connected by contacts and vertical connections. Using connections via EN/ENO enforces in accordance with IEC 61131 the desired execution order for modular units as well. The connections can also be realized as connectors as defined in the IEC 61131 standard, in order not to disturb the logic pattern.

In this manner it is made possible that execution of the ladder diagram in an IEC 61131 controller produces the same result as execution in a traditional 984 controller.

The invention claimed is:

1. A method for computer implemented conversion of traditional ladder diagrams, read and executed column by column, for programmable logic controllers, in accordance with the 984 model, into ladder diagrams read and executed in a data-flow-oriented manner for IEC 61131-oriented controllers, said method characterized in that:
   in the traditional ladder diagrams, read and executed column by column, it is determined whether within the network certain original variables occur on both coils and contacts,
   it is determined, whether the contact according to the 984 model is processed before the associated coil and according to the IEC model is processed after the associated coil,
   in the affirmative case, for each such original variable, one additional variable is generated and this additional variable is recorded with the respective contact instead of the original variable, and
   wherein a contact with the original variable is connected to the power supply simulation at the end of the network, followed by a coil with the generated variable.

2. The method of claim 1, characterized in that:
   the functional blocks of a ladder diagram are connected with the help of EN inputs and ENO outputs in conformity with IEC 61131-oriented controllers, in the order of processing of the 984 model.

* * * * *